United States Patent Office 3,287,336
Patented Nov. 22, 1966

3,287,336
PROCESS FOR CHLORINATING VINYL CHLORIDE POLYMERS WITH AN OXYGEN CATALYST
John Heyward Taylor, Widnes, England, assignor to Imperial Chemical Industries Limited, London, England, a corporation of Great Britain
No Drawing. Filed Oct. 15, 1962, Ser. No. 230,698
Claims priority, application Great Britain, Oct. 18, 1961, 37,362/61
7 Claims. (Cl. 260—87.1)

The present invention relates to chlorinated polymers. More particularly it relates to chlorinated polymers of vinyl chloride and to an improved process for the production of such chlorinated polymers.

Vinyl resins are widly used in the form of sheets, coatings, pressings, extrusions, etc. It has long been known that some of the properties of the resins, such as high temperature stability and hot-working properties, can be improved by chlorinating the resins to a higher chlorine content than that of the polymerised vinyl chloride. It is known to produce chlorinated polyvinyl chloride by passing gaseous chlorine through a solution or dispersion of polyvinyl chloride and to increase the reaction velocity by supplying actinic radiation to the reaction zone. It has also been proposed to chlorinate mixed resins including resins containing a major proportion of polyvinyl chloride in the presence of free-radical-forming catalysts such as diacyl peroxides, for instance dibenzoyl peroxide, and preferably also in the presence of actinic radiation.

Photo-chlorination of polyvinyl chloride in solution is reasonably rapid, but it has the disadvantage of requiring large quantities of organic solvents which are difficult to remove from the product, and also most of the suitable solvents are to some extent themselves chlorinated during the reaction, resulting in wastage of chlorine. Photo-chlorination of a dispersion of polyvinyl chloride in an aqueous medium avoids these disadvantages, but when dispersions are chlorinated on a commercial scale there is a considerable problem of getting sufficient illumination into all parts of the dispersion because such a dispersion is relatively opaque.

We have found surprisingly that dispersions of polyvinyl chloride in an aqueous medium can be chlorinated quite rapidly by adding gaseous chlorine, even in the absence of actinic radiation, provided that a small amount of oxygen is maintained in the reaction zone throughout the reaction period. This is the more surprising since in connection with prior art methods of chlorinating polyvinyl chloride in the presence of light it has been stated that significant amounts of oxygen should be excluded and steps have been taken to remove dissolved oxygen from the apparatus by purging with an inert gas before starting the chlorination reaction.

According to the present invention we provide a process for the manufacture of chlorinated polyvinyl chloride which comprises introducing chlorine gas into an aqueous dispersion of polyvinyl chloride in the presence of oxygen.

In this specification by the term polyvinyl chloride we mean vinyl chloride homopolymers and vinyl chloride/vinyl acetate copolymers containing at least 70% by weight vinyl chloride.

The solids content of the dispersion to be chlorinated is not critical, but may conveniently be in the range 10-40% by weight for homopolymers of vinyl chloride and preferably 5-30% by weight for vinyl chloride/vinyl acetate copolymers, since the copolymers have lower softening points and tend to agglomerate at higher concentrations. The process of the invention may be carried out quite rapidly in the absence of actinic radiation, but if desired, for example with suspensions of low solids content which are not of very high opacity, such radiation may be supplied to the reaction zone.

The chlorination may be carried out in the presence of additional materials if desired. These additional materials may be used for example for purposes of adjusting the density of the aqueous phase of the dispersion or the interfacial tension of the phases of the dispersion. Thus for example there may be present in the dispersion surface active agents and/or any salts which do not have an adverse effect on the chlorination reaction or on the chlorinated product, including alkali metal and alkaline earth metal salts, for example sodium chloride, potassium chloride, calcium chloride and mixtures thereof. Hydrochloric acid may also be present, in addition to that produced during the chlorination, as this has a particularly useful wetting effect on the polyvinyl chloride and the chlorinated product.

The process of the invention may be applied to any dispersion of polyvinyl chloride in an aqueous medium. For example a granular polyvinyl chloride may be dispersed by agitation in water or hydrochloric acid. A dispersing agent may be added but this is not essential. A swelling agent for the polyvinyl chloride particles, such as chloroform, may be added if desired to encourage more uniform chlorination. Alternatively a latex may be prepared by polymerising vinyl chloride in the presence of water, a dispersing agent and a polymerisation catalyst as is known in the art of emulsion polymerisation of vinyl chloride. Another way of preparing a suitable latex is to dissolve polyvinyl chloride in an organic solvent and emulsify the solution in water. The resultant latex may be concentrated before being submitted to the chlorination process by distilling off a major portion of the organic solvent, preferably under vacuum, while agitating the latex. The process of the present invention is particularly advantageous when applied to a polyvinyl chloride latex since the latex is very opaque to light and is difficult to chlorinate by the known photo-chlorination processes.

In carrying out the process of the invention the oxygen may be supplied to the reaction zone by introducing oxygen gas or air or a compound which liberates oxygen under the reaction conditions. Such compounds include hydrogen peroxide, the alkyl hydroperoxides and the dialkyl peroxides. The oxygen or the oxygen-liberating compound may be supplied intermittently to the reaction zone or it may be added continuously. Continuous addition has the advantage of guarding against oxygen starvation at any time and we have found that if oxygen starvation is allowed to occur the reaction rate falls off and increases again when the oxygen deficiency is made good.

It appears that when hydrogen peroxide is used as the catalyst its effect is to liberate the necessary oxygen in the reaction zone. If the hydrogen peroxide supply is cut off the chlorination rate diminishes when the peroxide present has been destroyed, and the rate increases again when more hydrogen peroxide is added. A similar effect is found when the alkyl hydroperoxides and the dialkyl peroxides are used. Furthermore, we have found that an equivalent effect is not produced by the acyl peroxides such as dibenzoyl peroxide and lauroyl peroxide which are known from the prior art to operate to some extent at least as free-radical-forming catalysts. Such peroxides give very inferior results. They do not appear to liberate oxygen under the conditions of the chlorination reaction and they are not included within the scope of the present invention.

We prefer to employ the minimum amount of catalyst consistent with a fast rate of reaction and attainment of the desired chlorine content in the product. When working with a continuous feed of oxygen as the catalyst we prefer to limit the oxygen supply to 0.3–0.4 litres per hour per kilo of polyvinyl chloride in the suspension to be chlorinated. Approximately the same catalytic effect can be obtained when using hydrogen peroxide by adding about 0.05% by weight of hydrogen peroxide, calculated on the weight of polyvinyl chloride, every 15 minutes. The hydrogen peroxide may suitably be added as a 6% aqueous solution. There is little advantage in using higher rates of catalyst addition than these, but greater amounts may be employed if desired when heat stability of the product is not of the first importance. The optimum amount of catalyst depends to some extent on the physical form of the polymer particles; for instance a continuous feed of as little as 0.05 litres of oxygen per hour ped kilo of polyvinyl chloride gives a fast rate of reaction with porous granular polymers.

We have found that the process of the present invention gives a rapid rate of chlorination throughout at a temperature of about 70° C. and higher. At lower temperatures for instance 63–67° C. or even lower e.g. 54–58° C. we have found that the initial rate of chlorination is rather low but after what appears to be an induction period, which is longer the lower the temperature, the rate becomes very rapid so that the overall rate is quite high. We prefer to employ temperatures in the range 70–85° C. when working at atmospheric pressure, since lower temperatures give a slower initial rate of reaction and at higher temperatures there is a difficulty in maintaining a sufficiently high chlorine concentration in the reaction medium to support a fast rate of reaction. The reaction may however be carried out at superatmospheric pressure in order to increase the solubility of chlorine in the reaction medium if desired.

The chlorinated polyvinyl chloride product may be treated in conventional manner after chlorination is complete, so as to obtain the chlorinated product as a dry solid. This may be done for example by filtering, neutralising acidity in the filter cake if desired with sodium bicarbonate, washing with water and drying.

The invention is further illustrated by the following examples, in which percentages are by weight. In particular the examples show the advantageous use of oxygen, added in the form of molecular oxygen or oxygen-liberating compounds, according to the invention in contrast to the use of a diacyl peroxide.

Example 1

Chlorination of a dispersion of macrogranular polyvinyl chloride in the temperature range 80–90° C. with a slow flow of oxygen bubbled through the dispersion produced a product with chlorine content 63% by weight in 2 hrs. 35 mins. In a similar trial using a drip feed of hydrogen peroxide instead of oxygen the same chlorine content was reached in 2 hrs. 50 mins. In a comparative experiment in which no oxygen or hydrogen peroxide was added, but instead a diacyl peroxide, namely dibenzoyl peroxide, was present, in 2 hrs. 50 mins. the chlorine content of the product was only 59.8%.

In each case the dispersion was prepared by mechanically agitating 700 g. of a macrogranular polyvinyl chloride (K-value 65) in a mixture of 1200 ml. of water and 1400 ml. of concentrated hydrochloric acid. The dispersion was agitated throughout the chlorination reaction, chlorine gas being passed in at a rate just sufficient to ensure as near as possible 100% up-take with the fastest possible rate of reaction. The dispersion was heated to about 80° C. before starting the chlorine feed. Thereafter, the small heat of reaction was sufficient to maintain the temperature in the range 80–90° C. until near the end of the reaction, when some external heating was applied.

Example 2

Dispersions of macro-granular polyvinyl chloride powders of the K-values shown in the table were prepared by agitating 700 g. of the polymer in 2600 ml. of 21% hydrochloric acid and each batch was chlorinated for the times and at the temperatures shown by passing chlorine gas through the agitated dispersion with various catalysts present as shown. The rate of chlorine addition was adjusted so that a very slight excess passed out of the reactor, i.e. so as to ensure the fastest rate of reaction with as near as possible 100% up-take. The molecular oxygen catalyst was supplied by bubbling oxygen gas continuously through the dispersion at the rate of about 0.3 litres per hour. The hydrogen peroxide was supplied by adding 5 ml. of 6% hydrogen peroxide every 15 minutes. Lauroyl peroxide and benzoyl peroxide were added in the form of fine powder at the start. The rates of chlorination achieved are illustrated by the difference between the initial and final chlorine contents of the polymer. It is seen that the use of oxygen and hydrogen peroxide according to the invention is very much more effective than the use of the diacyl peroxides.

| K value of Starting Polymer | Catalyst | Temp. (° C.) | Period of Chlorination (hours) | Difference Between Initial and Final Chlorine Content (Percent) |
|---|---|---|---|---|
| 65 | None | 85 | 6.0 | 2.6 |
| 65 | Lauroyl Peroxide, 3.5 g | 75 | 5.0 | 3.2 |
| 65 | Benzoyl Peroxide, 5 g | 85 | 2.9 | 3.8 |
| 65 | Molecular Oxygen | 85 | 6.0 | 10.0 |
| 65 | ----do---- | 75 | 3.4 | 7.9 |
| 65 | ----do---- | 65 | 4.0 | 7.7 |
| 65 | Hydrogen Peroxide | 70 | 4.0 | 7.5 |
| 65 | ----do---- | 55 | 6.5 | 7.6 |
| 60 | Molecular Oxygen | 85 | 6.0 | 10.0 |
| 55 | Hydrogen Peroxide | 85 | 3.5 | 7.5 |

Example 3

The procedure of Example 2 was repeated using a fine powder polyvinyl chloride polymer of K-value 65, with and without a supply of oxygen at 0.3 litre per hour as catalyst. The results are shown in the table.

| Catalyst | Temp. (° C.) | Period of Chlorination (hours) | Difference Between Initial and Final Chlorine Content (Percent) |
|---|---|---|---|
| None | 85 | 5.3 | 1.2 |
| Molecular Oxygen | 85 | 6.0 | 8.4 |

Example 4

The procedure of Example 2 was repeated with a macrogranular polymer of K-value 65 with the exception that the dispersion medium at the start was water instead of hydrochloric acid. At the same time a latex of polyvinyl chloride in water, containing 14% w./w. of the polymer, K-value 65, was submitted to the same chlorination procedure. Molecular oxygen as in Example 2 was supplied as catalyst in both cases.

| Type of Polymer | Temp. (°C.) | Period of Chlorination (hours) | Difference Between Initial and Final Chlorine Content (Percent) |
|---|---|---|---|
| Macrogranular | 75 | 5.5 | 10.9 |
| Latex | 80 | 3.3 | 7.6 |

*Example 5*

700 g. of a granular polyvinyl chloride, K-value 60, was dispersed by agitation in 2600 ml. of water containing 1% by weight of calcium chloride. 3.5 g. of tertiary butyl hydroperoxide were added as catalyst and chlorine gas was passed into the agitated dispersion as in Example 2. The experiment was repeated using 3.5 g. of di-tertiary butyl peroxide instead of the hydroperoxide as catalyst. In both experiments the difference between the initial and final chlorine contents of the polymer was found to be between 5% and 5.5% by weight after 2 hours' chlorination and further reaction then became slow so that it was necessary to repeat the addition of catalyst in order to continue chlorination.

*Example 6*

Granular copolymers of vinyl chloride/vinyl acetate (K-value 46) were chlorinated as dispersions in water containing 1% by weight of calcium chloride at a temperature of 75° C. by passing chlorine gas through the agitated dispersions at the fastest rate possible to achieve approximately 100% up-take of chlorine both with and without a continuous supply of oxygen bubbled through the solution. The oxygen was supplied at a rate of 0.3 litre per hour. The results obtained after 5 hours' chlorination are shown in the following table.

| Volume of Dispersion Medium (ml.) | Concentration of Polymer in Dispersion (Percent) | Vinyl Chloride Content of Polymer (Percent) | Catalyst | Difference Between Initial and Final Chlorine Content (Percent) |
|---|---|---|---|---|
| 2,600 | 12.5 | 84 | None | 10.7 |
| 2,600 | 12.5 | 84 | Molecular Oxygen | 15.5 |
| 2,800 | 14.0 | 89 | None | 3.3 |
| 2,800 | 14.0 | 89 | Molecular Oxygen | 14.4 |

It was found that such copolymers chlorinate more rapidly than homopolymers of vinyl chloride in the initial stages even in the absence of the oxygen catalyst, but that the oxygen catalyst was quite essential when it was desired to increase the chlorine content of the copolymer beyond about 58.7% by weight.

What we claim is:

1. A process for the manufacture of chlorinated vinyl chloride polymers selected from the group consisting of vinyl chloride homopolymers and vinyl chloride/vinyl acetate copolymers containing at least 70% by weight vinyl chloride, which comprises introducing chlorine gas into an aqueous dispersion of said vinyl chloride polymer in the presence of an oxygen catalyst consisting essentially of at least one member selected from the group consisting of molecular oxygen, hydrogen peroxide, a lower alkyl hydroperoxide and a di-lower alkyl peroxide and at a chlorination temperature of 54 to 85° C.

2. A process according to claim 1 wherein a catalytic amount of oxygen is maintained throughout the chlorination reaction.

3. A process according to claim 1, wherein a homopolymer of vinyl chloride is submitted to chlorination.

4. A process according to claim 1, wherein a vinyl chloride/vinyl acetate copolymer containing at least 70% vinyl chloride by weight is submitted to chlorination.

5. A process according to claim 1 wherein the oxygen is supplied as molecular oxygen.

6. A process according to claim 1, wherein said catalyst is an oxygen-liberating compound is selected from the group consisting of hydrogen peroxide, a lower alkyl hydroperoxide and a di-lower alkyl peroxide.

7. A process according to claim 1, wherein the reaction temperature is in the range 70–85° C.

References Cited by the Examiner
UNITED STATES PATENTS 2,503,252  4/1950  Ernsberger _____ 260—92.8
2,980,656  4/1960  Jones _____ 260—96

JOSEPH L. SCHOFER, *Primary Examiner.*

J. F. McNALLY, *Assistant Examiner.*